United States Patent [19]
Loban et al.

[11] Patent Number: 5,179,440
[45] Date of Patent: Jan. 12, 1993

[54] REAR PROJECTION FACETTED DOME

[75] Inventors: Jerry M. Loban, Grapevine; Kenneth R. Brooke, Arlington, both of Tex.

[73] Assignee: Hughes Aircraft Company, Los Angeles, Calif.

[21] Appl. No.: 704,571

[22] Filed: May 13, 1991

[51] Int. Cl.$^5$ .............................................. H04N 5/74
[52] U.S. Cl. ........................................ 358/87; 358/231
[58] Field of Search .................... 353/30, 94, 119; 434/307, 43, 44, 30, 38; 358/87, 104, 60, 231, 237, 248, 254; 352/69-71

[56] References Cited

U.S. PATENT DOCUMENTS

| | | | |
|---|---|---|---|
| 3,370,505 | 2/1968 | Bryan | 352/69 X |
| 3,514,871 | 6/1970 | Tucker | 352/70 X |
| 4,646,506 | 4/1987 | Ritchey | 358/87 |
| 4,962,420 | 10/1990 | Judenich | 358/104 X |
| 4,974,073 | 11/1990 | Inova | 358/104 X |
| 4,991,955 | 2/1991 | Vetter | 352/70 X |
| 5,023,725 | 6/1991 | McCutchen | 358/231 |

Primary Examiner—James J. Groody
Assistant Examiner—Mark R. Powell
Attorney, Agent, or Firm—Michael W. Sales; Wanda K. Denson-Low

[57] ABSTRACT

A multi-facetted dome imaging system (10) utilizes rear projection imaging techniques to present a moving or still image to each screen facet (12). The trapezoidal facets (12) are arranged with a series of lower facets (16), upper facets (18), and a top facet (20) generally forming a dome (11). Each facet (12) has a projector (30) disposed at its rear to project the image. Visibility of facet joints is minimized by joining the facets (12) by a pair of transparent stiffeners (42, 44) which hold the mating portions of the screen facets (12). The stiffeners (42, 44) are suspended by springs (48), which are held by a support structure (50).

16 Claims, 4 Drawing Sheets

REAR PROJECTION FACETTED DOME

BACKGROUND OF THE INVENTION

1. Technical Field

This invention relates to imaging systems, and more particularly to a rear projection dome imaging system.

2. Discussion

Domed imaging systems are used in a variety of applications ranging from entertainment to simulation. Domed imaging visual systems are capable of generating scenes with a high level of realism because the scene is presented to the viewer in many directions at once and not just from a single flat plane as in most conventional imaging systems. This capability of producing a wide field of regard is highly desirable in entertainment systems and is quite necessary in many simulation systems.

Conventional domed imaging systems typically employ front projection techniques. Like conventional movie theaters, these systems employ one or more projectors which are positioned on the same side of the screen as the viewer to project still and/or moving images onto the screen or dome. The dome may consist of a single curved screen or may comprise multiple screens.

Unfortunately, front projection imaging systems have a number of drawbacks. Most obvious are the limitations resulting from the physical and geometrical requirements of such systems. Because the projector and projected light rays are on the same side of the screen as the viewer physical limitations are imposed which restrict placement and movement of the viewer. Further, in simulation and training systems the necessity of avoiding occluding projected light rays places severe limitations on training device location and configuration. In domed visual systems which employ multiple projectors these physical limitations also undesirably restrict the number of projectors, and hence the number of images, that the system can employ.

Another disadvantage with front projection domed systems pertains to the screens themselves. Front projection screens must have a surface with very critical optical characteristics which are necessary to produce sufficient off-axis luminance. Producing screens with these desired characteristics is an expensive process requiring specialized talent to produce the required finish.

Another factor which contributes to the complexity and cost of front projection domed systems is due to the distortions caused by off-axis projection of images onto the curved surfaces. Correcting these distortions requires special video projectors capable of performing such corrections. This requires considerably more expensive projectors and the correction procedures consume a significant amount of time.

An additional correction that is frequently required in conventional domed display systems is due to the interface between adjacent images in multiple image systems. One method of performing this correction is an electronic device which performs a "soft fade" which gradually fades a scene as it begins to overlap to avoid increased brightness from edge portions where images from two projectors overlap. Besides adding to the cost and complexity of the system, "soft fade" techniques only work marginally well in masking the edge effects. Additional corrections are necessary due to off-axis distortions caused by curved screen surfaces. Often this requires expensive video projectors capable of performing such corrections, and edge matching. In addition, domed visual systems having multiple projectors generally require a separate projector and image generation system for each screen, despite the fact that active, or high resolution, images are not required for each channel at the same time.

Thus, it would be desirable to have a domed visual display system in which the placement of a viewer and other equipment is not appreciably restricted by the possibility of occluding projecting images. Also, it would be desirable to have a domed imaging system which does not require complex and expensive correction for edge matching and off-axis distortion correction.

Further, it would be desirable to have such a domed imaging system which utilizes a relatively inexpensive screen material. In addition, it would be desirable to have a domed imaging system providing a wide field of regard, in which edges between adjacent screen panels cannot be detected by the viewer, and which is relatively simple and inexpensive to produce. Finally, it would be desirable to provide a domed imaging system in which an active, or high resolution, image generation system is not required for each screen.

SUMMARY OF THE INVENTION

Pursuant to the present invention, a domed image projection system is provided utilizing rear projection technology. The system includes a translucent screen assembly having front and rear surfaces, the screen assembly being generally concave on the front viewing surface. The screen assembly also includes a plurality of interconnected screen panels. In addition, the system includes a plurality of image projectors disposed on the rear of the screen assembly. Each image projector produces an image on one of the screen panels so that the images can be viewed from the front of the screen assembly.

In the preferred embodiment each screen panel includes overlapping flange portions which protrude outward from the rear surface of the screen assembly along mating portions of the screen panels. Also, an apparatus for joining the screen panels is included which clamps together overlapping flange portions of adjacent screen panels. This results in a system in which distortion effects are easily corrected, and edge matching is easily implemented to minimize visibility of screen panel edges. Further, the entire interior volume of the dome is available for use due to the rear projection technology.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
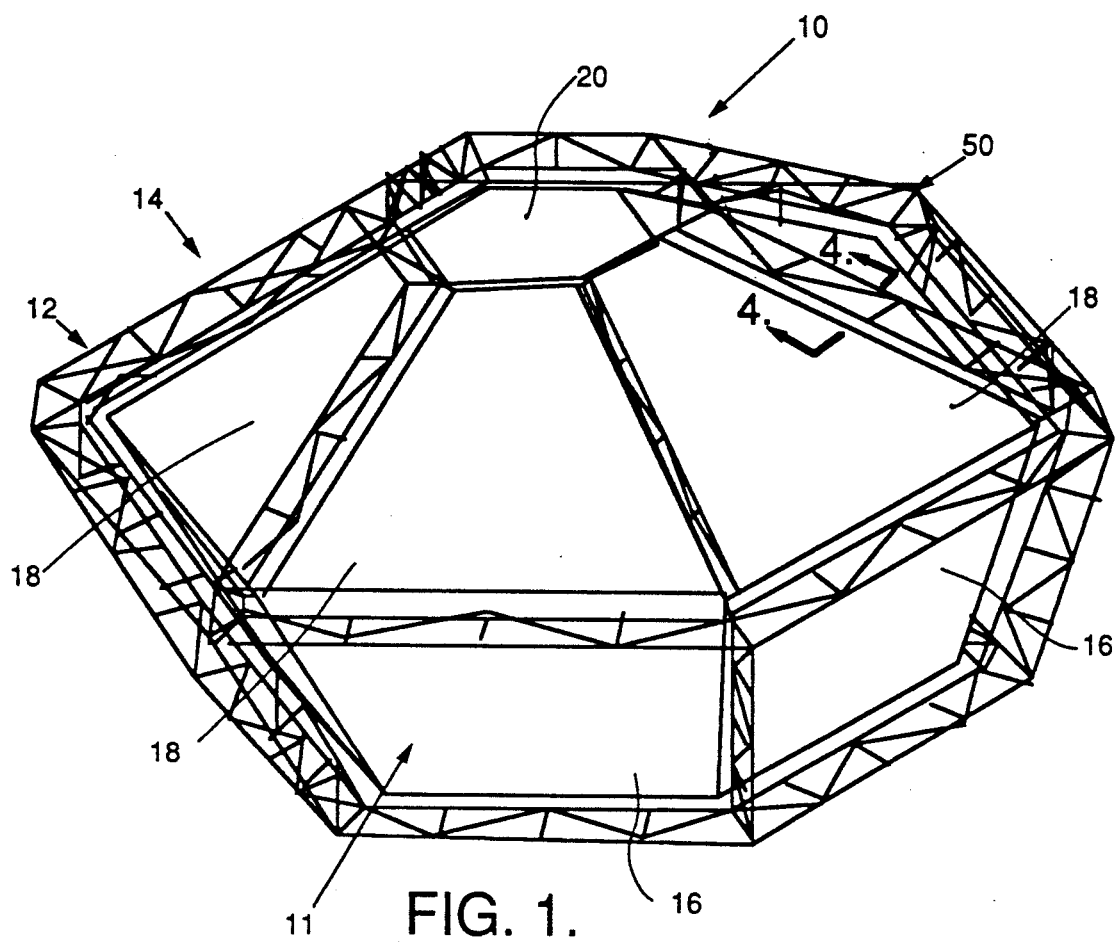
FIG. 1 is an exterior perspective view of the rear projection facetted dome system in accordance with the present invention.

Referring now to FIG. 1, there is shown an exterior view of the rear projection facetted dome system 10 in accordance with the present invention. This dome system 10 may be used in a number of applications such as entertainment and simulation systems. Accordingly, the size of the dome may vary depending on the application and the number of users to be accommodated at any given time. In accordance with the preferred embodiment, the dome 10 is used for simulation and training and provides a minimum eye relief of 106 inches. That is, with the user situated in the center of the interior of the dome system 10 the minimum distance from the user to the inner surface of the dome system 10 is 106 inches.

Figure 2:
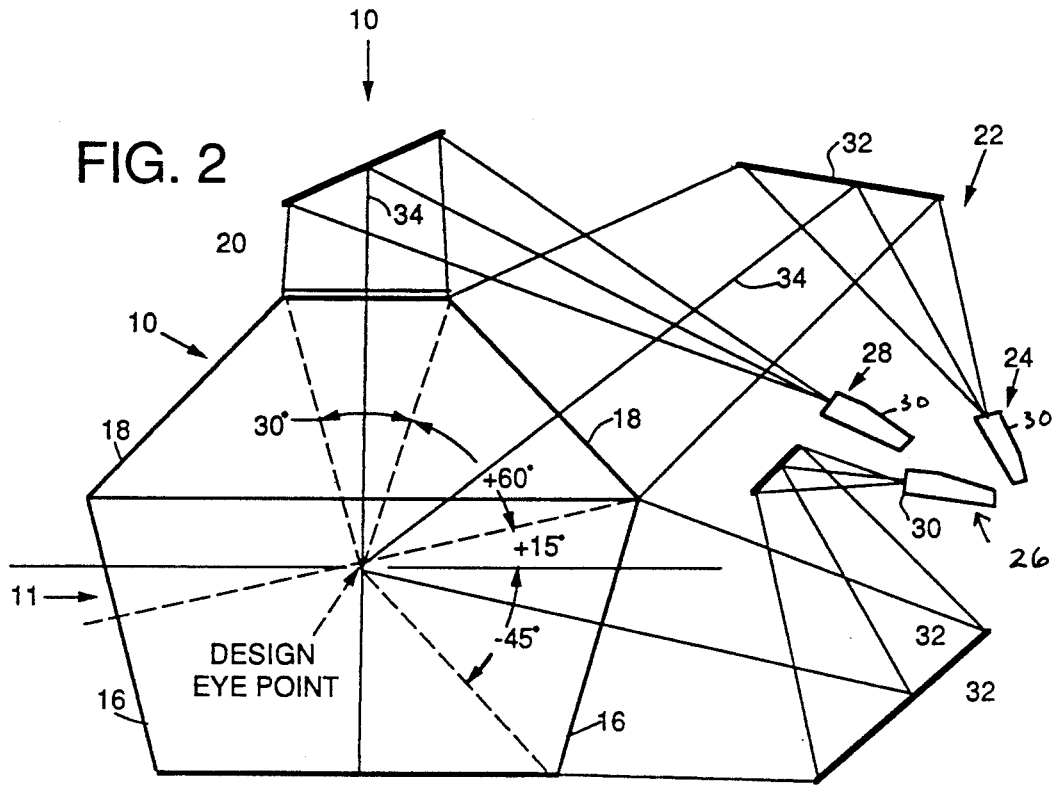
FIG. 2 is a side view of the packaging of the optical system in accordance with the present invention.
Figure 3:
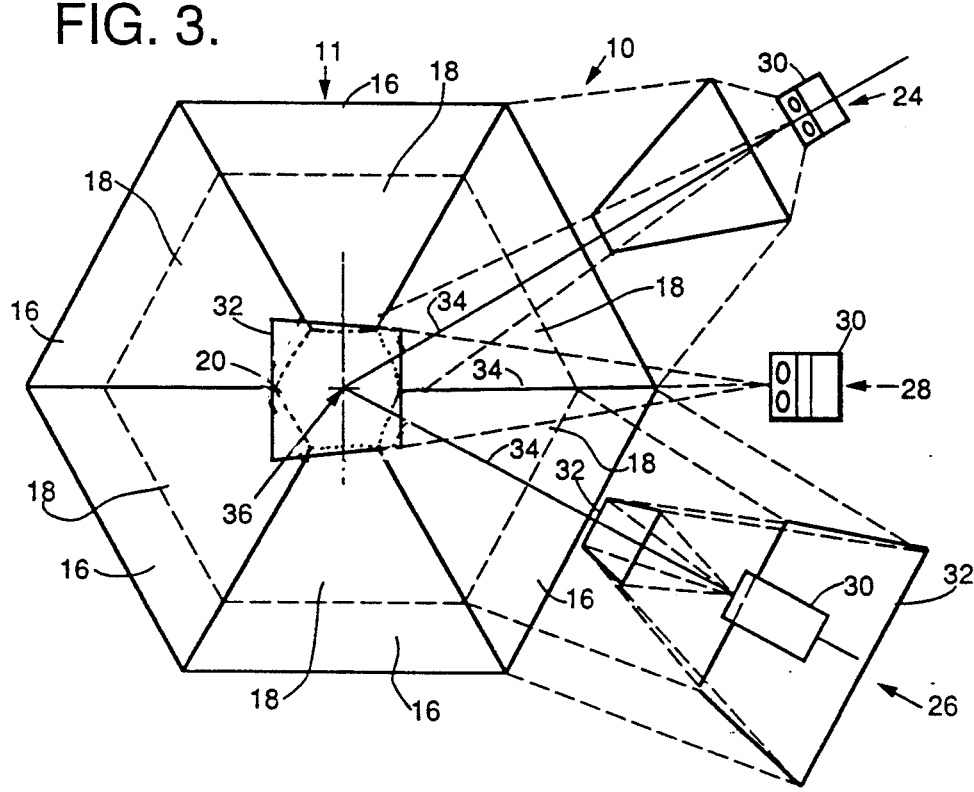
FIG. 3 is a plan view of the rear projection facetted dome showing the arrangement of individual projectors in accordance with the present invention.

As can be seen in FIG. 1, the dome system 10 includes a dome 11 which is constructed of a number of flat trapezoidal-shaped screen panels or facets 12. The screen panels 12 are held together by a screen support structure 14 which forms a frame-like skeleton for holding and supporting the screen panels 12. As shown in FIGS. 1-3, there are six lower screen facets 12 forming an annular configuration and resting on a base or floor surface (not shown). As best seen in FIG. 2, the six lower screen facets 16 are disposed generally vertically but tilted outward from the dome center. Six upper screen facets 18 are disposed adjacent to the upper surface of the lower screen facets 16 forming an annular ring configuration leaving a hexagonal opening at the top. A hexagonal top facet 20 substantially covers this hexagonal opening.

The resulting structure of the dome 11 forms an approximation of a dome shape. While this configuration has proved adequate for some uses, it will be appreciated that with a larger number of smaller facets, and also with the use of curved screen facets, the dome 10 can be made to provide a better approximation of a dome shape. However, the increased realism which may result is achieved at the cost of greater overall complexity and expense of the entire system.

Referring now to FIG. 2, portions of the display system 22 in accordance with the present invention are shown. In particular, the display system 22 includes an upper display system 24, a lower display system 26 and a top display system 28. Each of the display systems 24, 26 and 28 comprise, in general, a projector 30 and one or more fold mirrors 32 as well as appropriate mounting hardware (not shown).

It should be noted that in FIGS. 2 and 3, for sake of simplicity, only a single projector has been shown for the upper and lower display systems 24 and 26. However, in fact the upper display system includes six projectors 30 along with six sets of fold mirrors 32 to provide a separate image for each of the upper screen facets 18. Likewise, each of the lower screen facets 16 receives a separate image from one of the multiple projectors 30 in the lower display system 26. This is achieved by positioning the upper and lower display systems 24, 26 radially outward from the particular screen facet 12 to which it is aimed as best seen in FIG. 3. Of course, since there is only a single top facet 20, the top display system 28 need only include a single projector 30. The throw distance, that is, the total optical path from the projector 30 to the screen 12 in the preferred embodiment ranges from about 150" to 210".

Also, as best depicted in FIG. 2 the upper display system 24 projects an image upward to a fold mirror 32 which reflects the image towards an upper screen facet 18. The lower display system 26 projects the image toward the dome 11 and fold mirror 32 reflects the image back away from the dome 11 and downward to a second fold mirror 32 which then reflects the image to the lower screen facet 16.

As can be seen from FIGS. 2 and 3, this configuration results in the image being directed from the projectors 30 to the screen facets 12 such that the central ray 34 is perpendicular to the screen facet to which it is directed when it impinges on that screen facet 12. This optimal angle of incidence provides minimal distortion of the image at the screen facet 12 surface, and minimal reflection and resultant loss of brightness. Those skilled in the art will appreciate that since the screen facets 12 are not rectangular the upper, lower and top display systems, 24, 26 and 28, should include a capability called keystoning. This is a well-known technique for turning a conventional video image into a trapezoidal-shaped picture to match the shapes of the particular screen facet 12. Otherwise, the projectors 30 used in accordance with the present invention may comprise conventional three color (red, green, blue) video projectors commonly used on rear screen television systems.

Referring now to FIG. 2, it can be seen that the dome 11 is designed so that each facet 12 will be approximately equi-distant and perpendicular to the viewer at a central point called the design eye point 36. Further, since central rays 34 from each projector intersect each screen facet 12 perpendicularly the user at the design eye point 36 will also view each screen facet 12 from an optimum perpendicular viewing angle. The field of regard of the user from the design eye point 36 is 360° horizontally. That is, the user may turn his head 360° and will experience a continuous uninterrupted view within the dome 11. The vertical field of regard extends from the zenith 38 to the bottom of the lower screen facet 16 at the base or floor surface. This gives about 135° of vertical field of regard. Importantly, the area within the field of regard, in fact the entire interior of the dome 11 is available for use without restrictions such as would be present in a front projection screen system. For example, a front projection screen employing 12 projectors would obviously present severe limitations to the area also within the dome that is usable.

Figure 4:
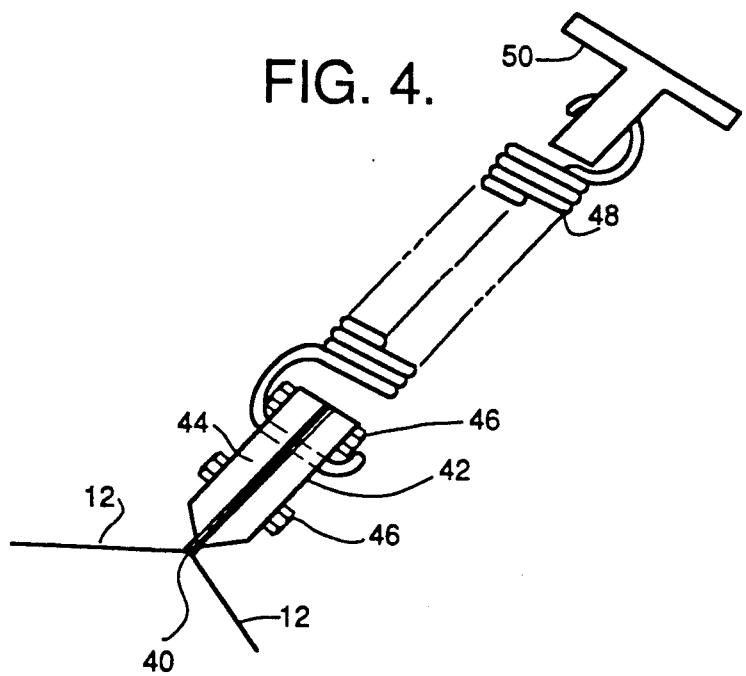
FIG. 4 is a cross-sectional view of a portion of the facet joint configuration taken along line 4—4 in FIG. 1.

Also important to the design of the dome 11, is the minimization of the visibility of the line of demarcation of the interface between adjacent screen facets 12. To achieve this goal, the present invention utilizes the facet joint configuration shown in FIGS. 4 and 5. As shown in FIG. 4, each screen facet 12 meets at a point 40 and then is bent outward to protrude away from the dome 11. Each screen facet 12 is sandwiched along with the adjacent screen facet between a pair of stiffeners 42, 44. The stiffeners are elongated members shown in cross-section in FIGS. 4 and 5. The screen facets 12 are bonded by means of an adhesive to the stiffeners 42, 44 and the stiffeners 42, 44 are attached to each other by means of bolts 46 which pass through openings 48 in the stiffeners 42, 44.

The mated acrylic stiffeners 42, 44 are suspended from a series of springs 48 placed intermittently along the length of each stiffener 42, 44 and held by a screen support structure 50. For example, the springs may be placed every 10 inches along the length of the stiffeners 42, 44. As best seen in FIG. 1, the screen support structure 50 comprises interconnected trusses disposed immediately outward from the facet interfaces. The screen support structure 50 is preferably composed of a strong but lightweight material such as aluminum.

All of the facet to facet interfaces are joined in this manner with the exception of the top screen facet 20. The top screen facet 20 is held by the screen support structure 50 in such a way as to raise this facet 20 about 3 inches above the top of the upper facets 18. The resulting gap, while providing a somewhat undesirable gap in the resulting image near the zenith, is useful to help stabilize air pressure differentials within the dome 10. This is useful to keep the flexible panels 12 flat. That is, while the flexible screen facets 12 are stretched taut by the support structure, due to their flexibility, pressure differentials can cause bowing in the screens. This may undesirably distort the resulting image. The gap surrounding the top facet 20 is useful in minimizing this effect.

In a preferred embodiment the screen facets 12 are manufactured from a conventional thin film rear projection screen material such as the PVC acetate film known as Lumiflex 130, manufactured by Stewart Film Screens of California. This screen has a thickness of approximately 0.016 plus or minus 0.005 inches and is a 1:1.3 gain diffusion material.

Figure 5:
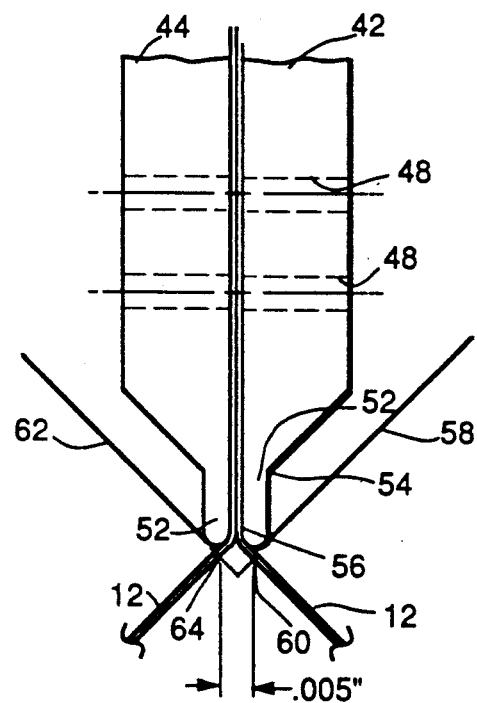
FIG. 5 is an expanded view of the facet joint configuration shown in FIG. 4.

As best seen in FIG. 5 the screen facets 12 are held by the stiffeners 42, 44 which have a reduced thickness portion leading to a thin ridge tip 52 having a rounded end. The adjacent screen facets 12 are brought together at the point where they are bent around the rounded corner of the tips 52 of the acrylic stiffeners 42, 44. This configuration results in a very sharp and precise angle at the facet to facet interface.

In accordance with a preferred embodiment, each stiffener 42, 44 is composed of a clear material such as acrylic. The outer surfaces of the acrylic stiffener are painted flat black except for portions of the tip 52. In particular, beginning at point 54 and proceeding downward in FIG. 5 around the rounded tip and upward to point 56 the stiffeners 42, 44 are left uncoated and thus are substantially transparent. As a result, light from the projector 30 which is near the edges of the screen facets 12 will not be occluded by the tips 52 of the stiffeners 42, 44. In particular, consider light ray 58 at the extreme edge of a facet 12 incident at a 7° angle with the facet surface. Ray 58, just touching the edge of the nose 2, will reach the facet at point 60. Likewise, a similar ray 62 at the adjacent facet will pass through the adjacent facet at point 64. The distance between point 60 and point 64 will be approximately 0.085 inches. That is, the distance of the total image which is affected by the stiffeners 42, 44 is only about 0.085 inches. This is less than one pixel in size in the typical configuration. Within this distance, that is, light beyond rays 58 and 62 will pass through portions of the clear tip of the acrylic stiffeners until they reach the facet to facet interface. Light in this region will experience some distortion and fuzzing but at the eye relief of 106 inches this will be very unnoticeable. Further, there will not be a bright line caused by overlapping images. Nor will there be dark lines caused by occlusions in the image.

Figure 6:
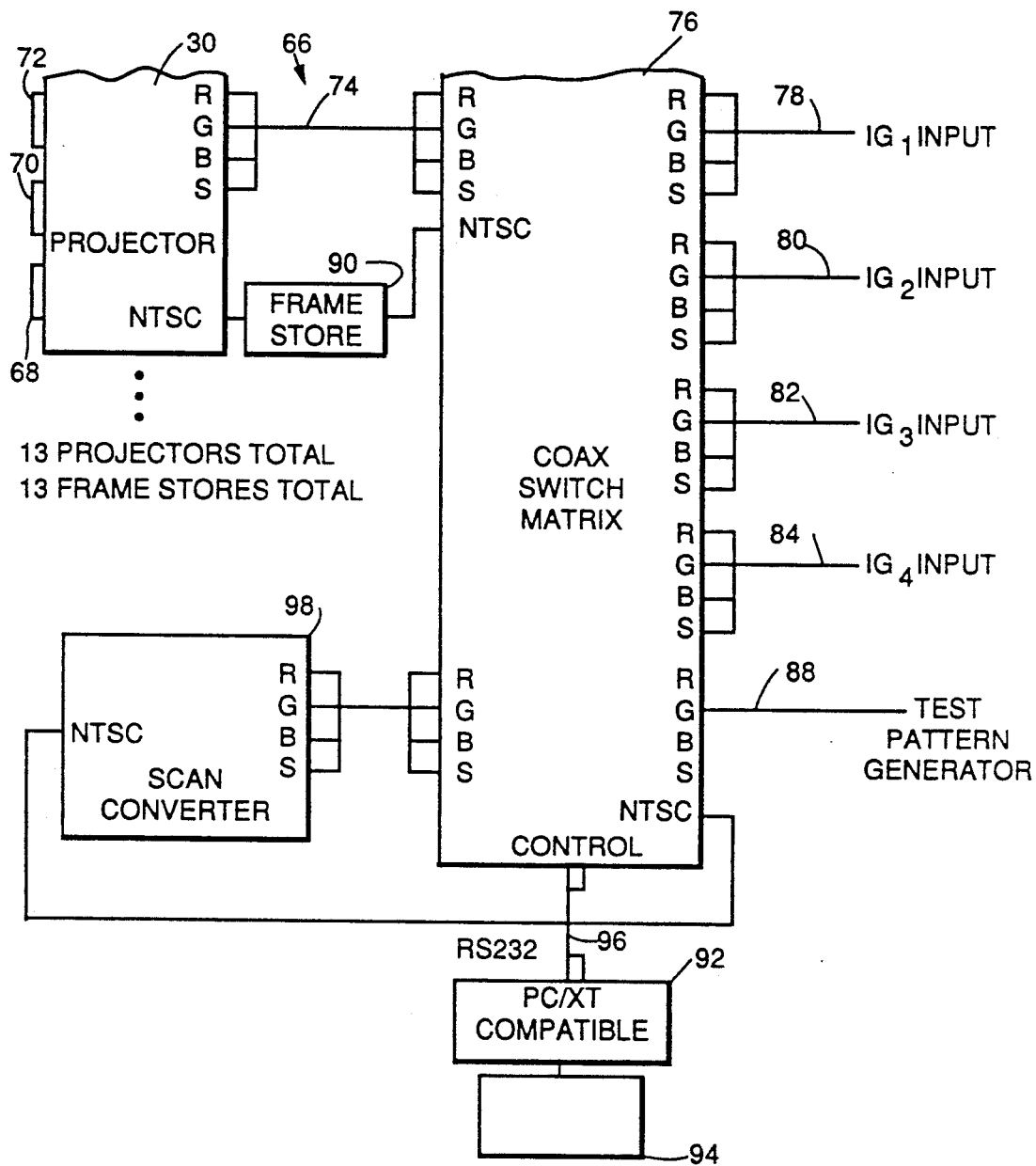
FIG. 6 is a block diagram of the image system circuitry for the rear projection facetted dome of the present invention shown in FIG. 1.

Referring now to FIG. 6, a circuit diagram of an image system 66 for the dome system 10 is shown. The image system 66 in general provides signals and image input for the projectors 30. In a preferred embodiment, there are 13 projectors 30 each having R, G and B image projectors 68, 70, 72. The projectors 30 (only one of which is shown in FIG. 6 for simplicity) each receive a video signal along line 74 from a conventional switch matrix circuit 76. The coaxial switch matrix circuit 76 receives four separate image inputs 78, 80, 82 and 84 as well as a test pattern generator input 88. It will be appreciated that each of the video signals 74, 78-88 comprise red, green, blue and synchronization signals. The image generators producing images along lines 78-84 are not shown but may comprise various sources of video images such as video tape players, and computer generated graphics systems.

Each projector 30 has coupled to it a frame store unit 90 which permits the projector 30 to display a single low resolution frame of a video signal instead of a dynamic moving image. Since the frame store 90 handles only low resolution video, the source imagery must be scan converted to NTSC by the scan converter 98 prior to the frame storage. Since there are only four image generation inputs in the image system 66 and thirteen projectors, the frame store unit 90 permits all thirteen projectors to project images simultaneously. That is, four of the projectors 30 may be utilized to project dynamic moving images and the other nine projectors may project still images. This is useful in simulation systems where the user will be presented with four moving images on four adjacent facets 12 in a given field of view. Thus, when the user turns in a different direction the four facets 12 which comprise the new field of view of the user can now be used to project the dynamic images. The facets 12 which previously had dynamic images will then be presented with non-distracting, low resolution, still images by means of the frame store unit 90.

To control which image is presented to which projector, and which projector receives moving versus still images, a Personel, Computer (PC 92) with keyboard 94 is attached to the control line 96 of the coaxial switch matrix circuit 76. The PC 92 may comprise a standard monochrome display with serial/parallel I/O and two disk drives. It will be appreciated that by suitable programming utilizing the computer 92, a training procedure can be developed which provides a realistic sequence of moving and still images within the dome 11 to the user.

The image system 66 also includes an NTSC scan convertor circuit 98 which may comprise for example a Monarch Model No. 8708 manufactured by Folsom Research, Inc. of Folsom, Calif. The purpose of the scan convertor 98 is to convert the high resolution imagery to NTSC video format, which can be handled by the video frame stores.

From the foregoing it can be appreciated that the present invention provides a dome system 10 that does not restrict the usable space within the dome and provides a great deal of flexibility as well as a realistic image for training or entertainment systems at reasonable costs. Those skilled in the art can appreciate that other advantages can be obtained from the use of this invention and that modification may be made without departing from the true spirit of the invention after studying the specification, drawings and following claims.

What is claimed is:

1. An image projection system comprising:

a translucent screen assembly having front and rear surfaces, said screen assembly being substantially concave on said front surface, said screen assembly including a plurality of interconnected flat screen panels arranged in a dome-like configuration; and a plurality of image projecting systems disposed on the rear of said screen assembly, each image projecting system including an image projector and fold mirrors and each for producing an image on one of said screen panels which is generally orthogonal to the rear surface of said one screen panel, each screen panel being disposed such that lines projecting orthogonally from the center of the front surface of each panel will all intersect at approximately the same point.

2. The image projection system of claim 1 wherein the shape of said screen assembly approximates a portion of a sphere.

3. The image projection system of claim 2 said screen assembly includes at least eleven interconnected screen panels, including at least five approximately vertically disposed lower screen panels, each being trapezoidal in shape and connected along vertical sides to form an annular configuration, and at least five upper screen panels disposed adjacent to each other on top of said lower panels, wherein said upper and lower panels substantially enclose the area in front of said screen assembly.

4. The image projection system of claim 2 wherein said screen assembly, when viewed from said front side creates a field of regard which covers 360 degrees of a horizontal angular field of view and at least 120 degrees of a vertical field of view.

5. The image projection system of claim 3 further comprising a horizontally disposed hexagonal screen panel, disposed at the top of said screen assembly, and adjacent to said upper screen panels.

6. The image projection system of claim 1 wherein adjacent screen panels include overlapping flange portions which protrude outward from the rear surface of said screen assembly along mating portions of said screen panels and said projection system further comprising means for joining said screen panels, including clamping means for holding together said overlapping flange portions of adjacent screen panels.

7. The image projection system of claim 6 further comprising a screen support frame having elongated frame members disposed above said clamping means;

a spring having one end attached to said clamping means and the other end attached to said screen support frame.

8. The image projection system of claim 6 wherein said clamping means further comprises:

two elongated members disposed on opposite sides of said overlapping flange portions of said adjacent screen panels;

fastening means for holding said two elongated members together with said overlapping flange portions sandwiched between them; and each elongated member having a reduced thickness portion near the base of said overlapping flanges wherein a portion of said light from said projectors passing to a screen panel near said mating portions of said screen panel will not be blocked by said clamping means.

9. The image projection system of claim 8 wherein said reduced thickness portions of said elongated members is substantially transparent to permit light from said projectors to pass through said reduced portions and to said screen panels.

10. The image projection system of claim 9 wherein said elongated members are opaque except for said transparent reduced thickness portions.

11. The image projection system of claim 1 further comprising video image generation system means including:

a plurality of image signal sources for generating video image signals;

a switch matrix means for transmitting said image signals to said projectors; and frame store means connected to each projector for storing individual frames of said video signals and also for transmitting said individual frames of said signals to said projectors, whereby selected ones of said projectors will transmit a still image to said screen panels.

12. The image projection system of claim 11 further comprising a host computer coupled to said switch matrix mans for controlling the transfer of video images through said switch matrix means to said projectors and frame store means.

13. A dome for an image projection system, said dome comprising:

a translucent screen assembly having front and rear surfaces, said screen assembly being concave on front surface;

said screen assembly including a plurality of interconnected screen panels, each screen panel being generally flat and disposed such that lines projecting orthogonally from the center of the front surface of each panel will all intersect at approximately the same point, wherein the shape of said screen assembly approximates a portion of a sphere;

said interconnected screen panels including overlapping flange portions which protrude outward from the rear surface of said screen assembly along mating portions of said screen panels; and means for joining said screen panels, including clamping means for holding together said overlapping flange portions of adjacent screen panels.

14. The dome of claim 13 further comprising a screen support frame having elongated frame members disposed above said clamping means;

two elongated members disposed on opposite sides of said overlapping flange portions of said adjacent screen panels;

fastening means for holding said two elongated members together with said overlapping flange portions sandwiched between them; and each elongated member having a reduced thickness portion near the base of said overlapping flanges.

15. The dome of claim 14 wherein said reduced thickness portions of said elongated members are substantially transparent.

16. A dome image projection system comprising: a translucent screen assembly having front and rear surfaces, said screen assembly being substantially concave on said front surface;

said screen assembly including a plurality of interconnected screen panels, each screen panel being generally flat and disposed such that lines projecting orthogonally from the center of the front surface of each panel will all intersect at approximately the same point, wherein the shape of said screen assembly approximates a portion of a sphere;

said interconnected screen panels including overlapping flange portions which protrude outward from the rear surface of said screen assembly along mating portions of said screen panels;

means for joining said screen panels, including clamping means for holding together said overlapping flange portions of adjacent screen panels;

a plurality of image signal sources for generating video image signals;

a switch matrix means for transmitting said image signals to said projectors; and frame store means connected to each projector for storing individual frames of said video signal and also transmitting said individual frames of said signals to said projectors, whereby selected ones of said projectors will transmit a still image to said screen panels.

* * * * *